March 20, 1934.  C. B. THOMPSON  1,951,537

MEANS FOR EXTRACTING FITTINGS

Filed Feb. 1, 1932

INVENTOR.
CARL B. THOMPSON
BY
John A. Watson
ATTORNEY.

Patented Mar. 20, 1934

1,951,537

UNITED STATES PATENT OFFICE 1,951,537

MEANS FOR EXTRACTING FITTINGS

Carl B. Thompson, South Bend, Ind., assignor to The Lubrication Corporation, South Bend, Ind., a corporation of Delaware Application February 1, 1932, Serial No. 590,061

6 Claims. (Cl. 254—104)

This invention relates to lubrication devices and more particularly to means for and methods of extracting lubrication fittings of the drive type from the recesses into which they have been driven.

Heretofore, as shown in applications of Adiel Y. Dodge, Serial #563,419 filed Sept. 17, 1931 and Serial #681,427, filed July 21, 1933 lubrication fittings have been devised capable of being driven into and securely fastened in recesses associated with bearings to be lubricated and various methods have been proposed for extracting the fittings for purposes of replacement or repair.

In service, such fittings may become damaged, so that replacement of the fitting becomes necessary. Heretofore, no fully satisfactory method of extracting a damaged fitting, to permit replacement has been devised.

One of the objects of my invention is to provide a method by which a drive fitting may be quickly, easily and efficiently extracted from the recessed receiving member with which it is associated.

Another object of this invention is to provide a tool capable of quickly, easily and efficiently extracting such a fitting from the recess with which it is associated.

Other objects, the advantages and uses of the invention will become apparent after reading the following description and claims and after viewing the accompanying drawing, in which:

Figure 1:
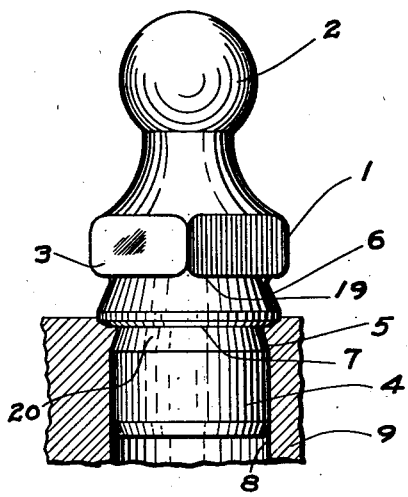
Fig. 1 is a view in elevation of a lubrication fitting and the body with which it is associated, the body being shown in section.
Figure 2:
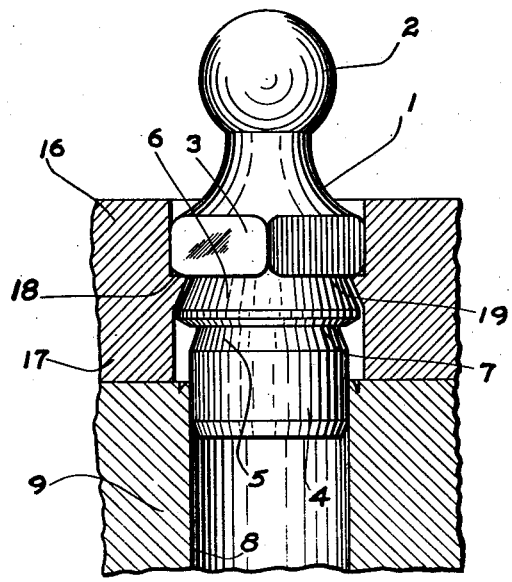
Fig. 2 is a view in elevation of the fitting of Figure 1 shown while being extracted from a recessed body by means of an extraction tool, the body and the extraction tool being shown in section.
Figure 3:
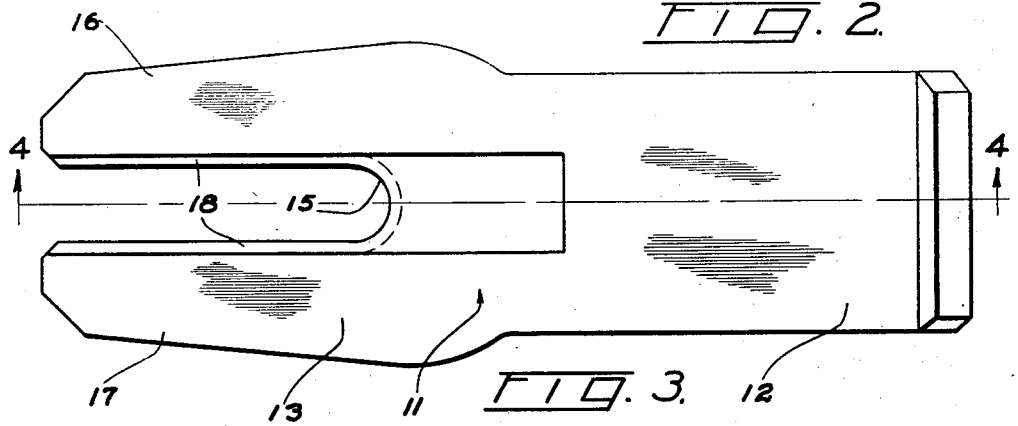
Fig. 3 is a plan view of the extraction tool.

In the drawing, I have selected for illustration, a lubrication fitting 1 having a head 2, an enlarged hexagonal body portion 3 and a shank portion 4. The shank is formed with an annular depression 5 and an annular groove 6, about its axis separated by a chamfered shoulder portion 7. The shank 4 is adapted to be driven into a recess 8 in a body 9, until the shoulder 7 contacts with the upper surface 10 of the body 9. Further driving of the fitting 1 causes a peening or swaging action by the shoulder 7 upon the body 9, causing the metal surrounding the recess 8 to flow into the depression 5.

When the depression 5 is substantially filled, the fitting is solidly seated and firmly secured in its receiving body 9.

An extraction tool 11 is provided with a solid shank portion 12 and a partially bifurcated portion 13 having a slot 15 between its tines 16 and 17. The slot 15 is just wide enough to admit the hexagonal portion 3 of the fitting, and each side is formed with a projecting step 18 adapted to enter the groove 6. The upper side of the groove 6 (which is the under side of the enlarged portion 3) is substantially flat, as is also the upper side of the steps 18. It should be noted that the lower part of the groove 6 is tapered to give strength to the shoulder 7, and the under side of the steps 18 have a corresponding slope.

Figure 4:
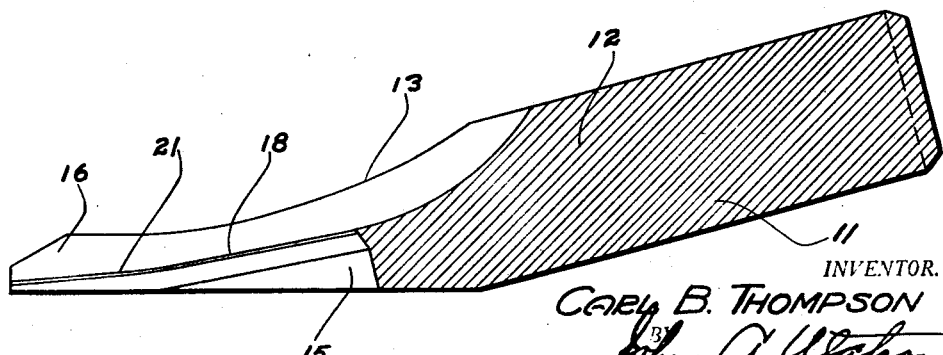
Fig. 4 is a sectional view along the line IV—IV of Fig. 3.

Referring to Fig. 4, it will be seen that the steps 18 at the extreme end of the extraction tool are quite close to the bottom face of the tool and inclined slightly thereto, the angle as illustrated being 4°. At a point 21 spaced from the end, the inclination of the step 18 changes, increasing rapidly to a greater angle (in this case 11°), and continues from that point at the latter angle to the rear end of the slot 15.

In using the tool 11 to extract a fitting, the tool is caused to approach the fitting with one tine on each side of the fitting, and the steps 18 admitted to opposed sides of the groove 6. Force is then applied to the rear or shank end of the tool, as by hammer blows, forcing the tool forward and wedging the steps 18 under the shoulder 19 forming the upper side of the groove 6. The acute angle of inclination of the steps 18 results in a tremendous force multiplying action, producing a vertical upward pressure on the under side of the shoulder 19 tending to lift the fitting 1 from recess 8.

As the fitting is thus lifted, the metal swaged into the depression 5 is forced back by the shank portion 4 and the tapered wall 20 until the recess is restored to substantially its original diameter. From this point on, less effort is required to lift the fitting, and it has been found that a wedging angle of 11° on the steps 18 is adequate to produce this effort.

The drawing and description cover only one embodiment of my invention and are for illustrative purposes only and it is to be understood that various changes may be made therein without departing from the spirit and scope of the claims. It may, for example, be found desirable to use an angle of inclination other than 4° for the forward part of the steps 18, or other than 11° for the rearward part of the steps. It may also be found advantageous to make the underside of the shoulder 19 other than flat, such as conical or spherical, and the upper side of the steps 18 correspondingly shaped to fit it.

I claim:

1. An extraction tool of the drive type for lubrication fittings, comprising a slotted wedge provided with an inwardly projecting step on each side of the slot, said projecting steps having flat upper walls forming an acute angle with the under surface of the wedge at the forward end of the slot, and a less acute angle throughout that portion at the rearward end of the slot.

2. An extraction tool of the drive type for lubrication fittings, comprising a slotted wedge provided with an inwardly projecting step on each side of the slot, said projecting steps forming an acute angle of about 4° with the under surface of the wedge at the forward end of the slot, and a less acute angle throughout that portion at the rearward end of the slot.

3. An extraction tool of the drive type for lubrication fittings, comprising a slotted wedge provided with an inwardly projecting step on each side of the slot, said projecting steps forming an acute angle with the under surface of the wedge at the forward end of the slot, and a less acute angle of about 11° throughout that portion at the rearward end of the slot.

4. An extraction tool for lubrication fittings comprising a slotted wedge provided with an inwardly projecting step on each side of the slot, said projecting steps having flat upper walls forming an acute angle with the under surface of the wedge at the forward end of the slot, and a less acute angle throughout that portion at the rearward end of the slot, said tool being further formed with a driving head.

5. An extraction tool for extracting a drive fitting of the type wherein metal of the receiving member is swaged into a depression in the side wall of the fitting by a drive shoulder formed on the fitting above said depression and wherein a downwardly facing lifting shoulder is disposed above said drive shoulder in spaced relation thereto comprising, a slotted member having an inwardly projecting wedging portion of low pitch and of a depth at its inner end substantially equal to the dimension between said drive and lifting shoulders measured longitudinally of the fitting, and another wedging portion of greater pitch disposed inwardly of the first wedging portion.

6. An extraction tool for extracting a drive fitting of the type wherein metal of the receiving member is swaged into a depression in the side wall of the fitting by a drive shoulder formed on the fitting above said depression and wherein a downwardly facing lifting shoulder is disposed above said drive shoulder in spaced relation thereto comprising, a slotted member adapted to be driven transversely of the axis of the fitting, said member having an inwardly projecting wedging portion of low pitch and of a depth at its inner end substantially equal to the dimension between said drive and lifting shoulders measured longitudinally of the fitting, and another wedging portion of greater pitch disposed inwardly of the first wedging portion and contiguous therewith, and of greater depth at its innermost end.

CARL B. THOMPSON.